United States Patent [19]
Connelly

[11] 3,863,758
[45] Feb. 4, 1975

[54] MOLDING COMPOSITIONS

[75] Inventor: Frank J. Connelly, Wilmington, Del.

[73] Assignee: Hercules Incorporated, Wilmington, Del.

[22] Filed: Nov. 29, 1973

[21] Appl. No.: 420,359

Related U.S. Application Data

[63] Continuation of Ser. No. 194,951, Nov. 2, 1971, abandoned.

[52] U.S. Cl. ............... 206/84, 161/43, 161/147, 161/162, 260/40, 260/42.17, 260/42.18, 260/42.45, 260/42.46
[51] Int. Cl. .................. B32b 3/00, B65d 81/00
[58] Field of Search ............. 161/43, 162, 252, 147, 161/148; 206/84

[56] References Cited
UNITED STATES PATENTS
| | | | |
|---|---|---|---|
| 3,121,656 | 2/1964 | Gluck | 161/162 X |
| 3,462,007 | 8/1969 | Heider et al. | 161/87 |
| 3,515,267 | 6/1970 | Rocca et al. | 206/521 |
| 3,734,814 | 5/1973 | Davis et al. | 161/170 |

*Primary Examiner*—George F. Lesmes
*Assistant Examiner*—Lorraine T. Kendell
*Attorney, Agent, or Firm*—Hazel L. Deming

[57] ABSTRACT

Thermoplastic molding compositions in a lightweight, flexible form are described. The compositions are produced by sandwiching a pulverulent thermoplastic polymer and preferably a mixture of polypropylene flake with glass fibers, between two films of a thermoplastic polymer compatible with the pulverulent polymer and then heat sealing the resulting sandwich at least along the open edges to encapsulate the pulverulent polymer between the films.

2 Claims, 3 Drawing Figures

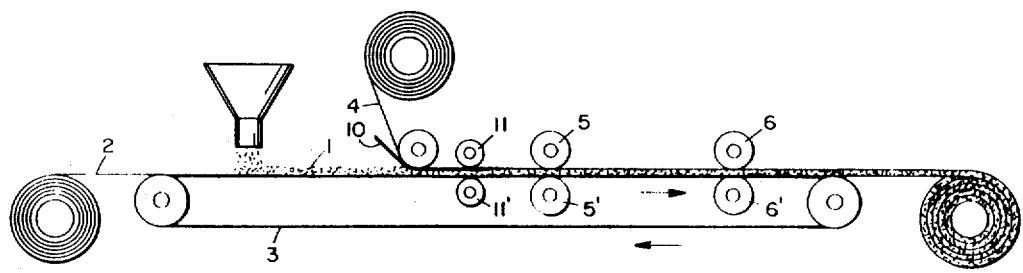
FIG. 1
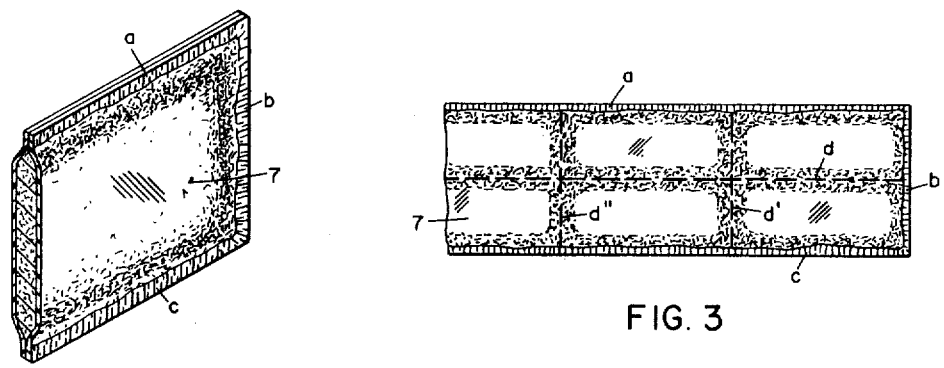
FIG. 2
FIG. 3
FRANK J. CONNELLY
INVENTOR

MOLDING COMPOSITIONS

This is a continuation of application Ser. No. 194,951, filed Nov. 2, 1971 and now abandoned.

The present invention relates to a process for the production of thermoplastic molding compositions and to the molding compositions so produced.

Molding compositions are generally produced in pellet or granular form by compounding the thermoplastic flake and any additives, such as pigments, stabilizers, fillers, reinforcing agents and the like, on a two roll mill or in an extruder and then comminuting the product or extrudate to give molding granules or pellets. The pellets or granules are then molded into articles using conventional injection or compression molding equipment. The molded articles so produced have, in general, relatively good physical properties. However, when reinforcing materials and particularly fibrous materials are added to the polymer, the fibers become broken during compounding and comminution and it is not possible to produce molded articles containing long fibers. Additionally, the fibers tend to become oriented in an undesirable manner. Moreover, the concentration of fibers that can be introduced is limited because the presence of fibers reduces the flowability of the thermoplastic material.

One method which has been proposed to overcome the disadvantages encountered with fibrous reinforcing material comprises stacking one or more layers of continuous fibrous web between two layers of thermoplastic material and then pressing the stack at a temperature above the melting point of the thermoplastic material so that the thermoplastic material flows to impregnate the fibrous web. Although this method overcomes the problem of fiber breakage and the limitations on the amount of fiber which can be present, the sheet molding compositions are not suitable for broad applications. For example they cannot be used in injection molding equipment without comminution which, of course, breaks the fibers and destroys the advantages achieved by the sheet formation. Moreover, the fibers penetrate the surfaces of the molding composition so that smooth articles cannot be formed therefrom. Additionally, the use of sheet imposes size and shape limitations on the final articles.

Now it has been found that molding compositions can be produced in a lightweight, flexible form which is convenient, easily cut to size and easily transported in roll form, which is not subject to the above disadvantages and limitations and which is particularly convenient for use with compression molding and vacuum forming equipment. Accordingly, the present invention relates to a method for producing molding compositions by sandwiching a pulverulent thermoplastic polymer uniformly between two films of thermoplastic polymer compatible with said pulverulent polymer and then sealing the resulting sandwich at least along the open edges thereof to encapsulate said pulverulent polymer between said films.

The pulverulent thermoplastic polymer which is the "filler" of the sandwich structure can be in powdered, flake or granular form and usually will have a maximum dimension of less than about 4 millimeters and preferably less than about 0.5 millimeter. The polymer can be any of the known thermoplastic film forming polymers suitable for molding processes. Exemplary of suitable polymers are the hydrocarbon polymers such as polyethylene (both low and high density), polypropylene, poly(butene-1), copolymers of ethylene and propylene, mixtures of polyethylene and polypropylene, mixtures of polypropylene and polybutylene; poly(vinyl acetate); poly(vinyl chloride); poly(vinylidene chloride); ethylene/vinyl acetate interpolymers; ethylene/acrylic acid interpolymers; vinyl chloride/vinyl acetate interpolymers; vinyl chloride/vinylidene chloride interpolymers; copolymers of vinylidene chloride with, for example, acrylonitrile, methacrylonitrile, the alkyl, aryl, alkaryl, aralkyl or cycloalkyl acrylates or methacrylates, the alkoxy alkyl acrylates or methacrylates, the haloalkyl acrylates or methacrylates, alkyl α-halo acrylates, methylisopropenyl ketone and methylvinyl ether; poly(vinyl propionate); poly(vinyl chloroacetate); polystyrene; poly(vinyl naphthalene); poly(ethyl vinyl ether); methyl, ethyl and butyl acrylate and methacrylate homopolymers; polyesters such as poly(ethylene terephthalate) and copolyesters of ethylene terephthalate and ethylene isophthalate; polyamides such as poly(hexamethylene adipamide), poly(hexamethylene sebacamide), polycaproamide, N-methoxymethyl poly(hexamethylene adipamide), polyacrylamide, polymethylacrylamide and poly(N-vinyl succinimide); poly(vinyl acetals) such as poly(vinylbutyral); poly(vinyl fluoride); poly(vinylidene fluoride); vinyl fluoride/vinylidene fluoride interpolymers; poly(chlorotrifluoroethylene); poly(tetrafluoroethylene); interpolymers of tetrafluoroethylene with hexafluoropropylene; vinyl fluoride/tetrafluoroethylene interpolymers; vinylidene fluoride/tetrafluoroethylene interpolymers; vinylidene fluoride/hexafluoroethylene interpolymers; poly(oxymethylene), poly(acrylonitrile); poly(vinylpyridine); polymers of allyl glycidyl ether; cellulose esters such as cellulose acetate and cellulose nitrate; rubber hydrochloride, and the like. The preferred polymers are homopolymers or random, block or graft copolymers of α-olefins containing 2 to 6 carbon atoms and particularly ethylene and propylene.

The two films of thermoplastic polymer which form the "covers" or outer surfaces of the sandwich structure can be alike or different. They usually will be the same and will have a thickness ranging from 1 to 20 mils and preferably from 1 to 10 mils. Thinner films, of course, can be used when strength or integrity is not of prime importance. Likewise, thicker films can be used when greater strength is necessary and flexibility is not important. The thermoplastic polymers which are utilized in film form can be the same as, or different from the pulverulent polymer which is utilized as the "filler" of the sandwich but in all cases the polymer of the film must be compatible with the pulverulent polymer if the advantages of the invention are to be realized. Typical thermoplastic polymers for film include all of those polymers listed above for use in pulverulent form. Ideally, the polymer used as the "filler" and "cover" of the sandwich will be a polymer of an α-olefin and most preferably either homopolymers or copolymers of ethylene and propylene.

As stated above, the process of the present invention comprises sandwiching the pulverulent thermoplastic polymer uniformly between films of a compatible thermoplastic polymer and then sealing the sandwich at least along the open edges. Preparation of the sandwich can be carried out in any known manner for inserting and sealing a pulverulent material between two films.

Thus, as is shown in the accompanying drawing, FIG. 1 is a schematic view of a moving belt assembly for inserting pulverulent material between two films to form a sandwich, FIG. 2 is a perspective cross-sectional view of the sealed sandwich of the invention and FIG. 3 is a top view of another embodiment of the sandwich after edge sealing and line sealing.

With reference to the drawing, preparation of the sandwich is conveniently carried out continuously by depositing the pulverulent material 1 onto a sheet of film 2 supported on a moving belt 3, placing a second sheet of film 4 over the deposited pulverulent material, and then passing the sandwich structure so formed between rolls 5-5' and 6-6' which lightly compact and aid in distributing the pulverulent material between the two films. Leveling and uniform distribution of the pulverulent material across the width of film 2 can be accomplished in any convenient manner. For example, as shown in FIG. 1, a metal sheet or leveling plate 10 is supported in the space between films 2 and 4 and extends gradually outward toward the edges of the film while extending in the direction of film travel, the plate terminating at a position beyond the edge sealing means 11-11' but before the rolls 5-5'. Edge sealing is conveniently performed with a hot cut-off sealer comprising a pair of pinch rolls and a hot wire sealer supported beyond the rolls. In the sealing operation, the films at their edges are pressed into close contact by passage between the pinch rolls and the "pinched" film is heat sealed at the edges by contact with the hot wire. A sandwich which has been heat sealed along the $a$, $b$ and $c$ edges to encapsulate the pulverulent material between the films and provide flexible molding packet 7 is shown in FIGS. 2 and 3. If desired, spot sealing, strip sealing or line sealing (denoted as broken lines $d$, $d'$ and $d''$, FIG. 3) can be included at various locations to maintain uniform distribution. The flexible heat sealed sandwich in sheet form can then be wound onto take-up rolls (not shown) and transported in this form to the thermoforming operation or, if desired, to storage for subsequent use.

The thickness of the layer of pulverulent material deposited on the sheet of film can vary within wide limits. Usually the thickness will range from 2 to 50 millimeters and preferably from 5 to 25 millimeters.

The particulate polymer can contain conventional additives such as stabilizers, dyes, pigments, nucleating agents, bonding agents, blowing agents, coupling agents, resin additives, plasticizers, slip agents, antistatic agents, reinforcing agents, fillers and the like. Additionally, or alternatively, the particulate polymer can be preblended with any of the above additives and the blend used as the sandwich filler. Particularly useful are blends of a particulate polyolefin, glass fibers and a coupling agent therefor. Other fibers which are useful include asbestos, graphite and carbon, and suitable fillers include talc, mica, glass plates or spheres, pigments, etc. The fibers will usually have an average length less than about 2½ inches, and will be present in the mixture in amounts up to about 85 percent by weight of the mixture of particulate polymer and fiber.

The invention is further illustrated by the following examples. All parts and percentages are by weight unless otherwise indicated.

EXAMPLE 1

A blend was prepared by dry mixing 100 parts of flake stereoregular polypropylene having an RSV of 3.0 (measured on a 0.1 percent solution of the polymer in decahydronaphthalene at 135°C.) and a birefringement melting point of 171°C., 1 part of stabilizer, 0.20 part of sodium stearate and 1.1 part coupling agent, and 25 parts of chopped E glass fibers having an average length of ¼ inch. The blend was placed in a bag of 10-mil polypropylene film and the bag closed by heat sealing, thus giving a packet which was 4 inches × 7 inches and ⅜ inch thick.

The packet was used as the molding composition for a camera body back 5 inches long × 2.5 inches wide × 1 inch high by placing the packet in a 2-part camera back mold, transferring the mold to a press, and heating for 30 seconds at 380°F. using less than 2,000 psig pressure. The molded article so formed had a smooth glossy surface and showed no evidence of exposed glass fibers. The article was the exact size and shape of the mold and indicated that the composition had flowed uniformly and completely filled the mold.

EXAMPLE 2

A blend was prepared according to Example 1 except that 30 parts of the glass fibers were mixed with 70 parts of the polypropylene flake. In this example the blend was placed as a uniform layer about ⅜ inch thick on a 6 inch square sheet of green, 10-mil polypropylene film and covered with a similar sheet of film. The resulting sandwich was then heat sealed along each edge to give a packet. This packet was used as a sheet molding composition by placing the packet in a press and compression molding for 2 minutes at 450°F. and 40,000 psig pressure. The molded product was a smooth, strong glossy sheet of green plastic having a thickness of ⅛ inch.

EXAMPLE 3

Onto a sheet of 10 mil polypropylene film was laid a mixture containing 70 parts of 2 inch glass fibers and 30 parts of the polypropylene flake of Example 1, the glass fibers being oriented in a random fashion in the plane of the film. A second sheet of the polypropylene film was laid over the mixture and the resulting sandwich heat sealed along the edges to give a packet. The packet was compression molded into a sheet at 450°F. for 5 minutes at 2,000 psig pressure, thereby forming a strong composite sheet ⅛ inch thick.

EXAMPLE 4

A blend was prepared by dry mixing 80 parts of poly(ethylene terephthalate) having an intrinsic viscosity of 0.65 (in the form of ⅛ inch cubes) with 20 parts of chopped E glass fibers having an average length of ¼ inch and then drying the mixture in a vacuum oven at 250°F. for 2 hours. This dried mixture was next placed in a 6 inch × 6 inch bag formed by heat sealing two superimposed sheets of 5 mil, oriented film of poly(ethylene terephthalate) along three sides. The bag containing the mixture was then heat sealed along the fourth side, giving a packet ¼ inch thick. The packet was stored for 3 days at 50 percent relative humidity after which time the packet was perforated at three separate locations with a needle and then was placed immediately between the platens of a press and compression molded at 525°F. for 5 minutes under 1,000 psig pressure. The product was a rigid, glossy, opaque sheet of glass reinforced poly(ethylene terephthalate) and was free of voids.

EXAMPLE 5

Molding composition in continuous sheet form was produced using the apparatus of FIG. 1 by continuously spreading a 3/16 inch layer of a blend of 100 parts of the polypropylene flake of Example 1 and 50 parts of ½ inch E glass fibers uniformly between two colored sheets of 6 mil polypropylene film 3 feet wide traveling at the rate of 3 feet/minute, the lower film being pigmented white and the upper film being pigmented red. The longitudinal edges of the two films were joined using hot-cut-off sealers and the sealed films next passed to line sealing means and hence to take-up rolls. In this example line sealing was provided in a quilted pattern (4 inches, transverse × 8 inches, longitudinal) by passing the film over a steel roll having the pattern raised thereon and along which ultrasonic vibrators were contacted. A roll of flexible molding composition, about 3/16 inch thick was obtained.

EXAMPLE 6

The procedure of Example 3 was repeated except that 1 mil polypropylene films were used and asbestos fibers were substituted for the glass fibers. The molded sheet so produced was a strong, rigid, sheet which was opaque, but glossy.

EXAMPLE 7

The procedure of Example 3 was repeated except that the mixture contained 85 parts of glass microspheres ranging in diameter from 3 to 15 microns and 15 parts of the polypropylene flake of Example 1. The compression molded product was a rigid, translucent sheet.

EXAMPLE 8

The procedure of Example 3 was repeated except that the films were 5 mil films of polyethylene having a density of 0.92. 70 parts of clay was substituted for the 70 parts of glass fibers, high density polyethylene flake (density of 0.96) was used in place of the polypropylene flake and molding into sheet form was carried out at 300°F. The sheet so produced was opaque and fairly stiff.

EXAMPLE 9

A molding composition was produced by enclosing a mixture of 70 parts of high impact polystyrene molding powder and 30 parts of ½ inch glass fibers, in 10 mil film of biaxially oriented polystyrene. The composition was shaped into a tray by radiantly heating the composition to about 250°F., transferring to an appropriate mold and then vacuum forming. The tray so produced had a glossy, scratch resistant surface and appeared satisfactory in all respects.

EXAMPLE 10

A molding composition was produced by enclosing a mixture of 30 parts of hydroxypropyl cellulose flake and 70 parts of powdered corn starch in 10 mil film of hydroxypropyl cellulose. The composition was compression molded into sheet at 320°F., giving a water-soluble plastic sheet about ¼ inch thick.

EXAMPLE 11

A molding composition was produced by sandwiching polypropylene flake (containing no light stabilizer or filler materials) between two 10 mil films of polypropylene pigmented with 2 percent carbon black, and then heat sealing the sandwich along each edge. The composition was compression molded at 450°F. into sheets and tested for light stability by exposing out of doors in Florida. The sheet from the molding composition of this example possessed comparable light stability to that of a sheet molded from unpigmented polypropylene flake containing 1 percent of an expensive light stabilizer.

EXAMPLE 12

A molding composition was produced by sandwiching polypropylene flake containing 0.5 percent of a heat stabilizer between two 5 mil films of polypropylene containing 1 percent of a light stabilizer, and then heat sealing the sandwich along each edge. The composition was then compression molded into sheet according to the procedure of Example 11. The sheet from the composition of this example had better heat and light stability than a sheet prepared in the same manner except that the heat and light stabilizers were distributed uniformly throughout the polypropylene flake and the polypropylene film.

EXAMPLE 13

The procedure of Example 3 was repeated except that the film was a 6 mil sheet of low density polyethylene, the mixture contained 85 parts of clay and 15 parts of an ethylene/vinyl acetate interpolymer containing 25 weight percent vinyl acetate and molding was carried out at 250°F. The sheet so produced was ⅛ inch thick and was a bendable, opaque sheet.

EXAMPLE 14

The procedure of Example 11 was repeated except that the film was unpigmented poly(methyl methacrylate), molding powder of acrylonitrile butadiene-styrene terpolymer was substituted for the polypropylene flake and the molding was carried out at 350°F. for 5 minutes at 2,000 psig pressure. When tested for outdoor stability, the rigid molded product of this example outperformed a molding made from the terpolymer alone.

What I claim and desire to protect by Letters Patent is:

1. A thermoplastic molding composition in the form of a packet consisting essentially of a blend of pulverulent thermoplastic film-forming polymer and up to 85 percent by weight of said blend of reinforcing fibers selected from the group consisting of glass fibers, asbestos fibers, graphite fibers and carbon fibers enclosed between two thermoplastic cover films of the same polymer as said pulverulent thermoplastic polymer, said cover films being heat sealed at least along the open edges.

2. The packet of claim 1 wherein said thermoplastic polymer is polypropylene and the reinforcing fibers are glass fibers.

* * * * *